US009764663B2

(12) United States Patent
Lee

(10) Patent No.: US 9,764,663 B2
(45) Date of Patent: Sep. 19, 2017

(54) CONVERTIBLE SEATING UNIT

(76) Inventor: James Shing Hin Lee, Hong Kong (CN)

( * ) Notice: Subject to any disclaimer, the term of this patent is extended or adjusted under 35 U.S.C. 154(b) by 0 days.

(21) Appl. No.: 14/388,159

(22) PCT Filed: Jun. 5, 2012

(86) PCT No.: PCT/CN2012/076485
§ 371 (c)(1),
(2), (4) Date: Nov. 18, 2014

(87) PCT Pub. No.: WO2013/181795
PCT Pub. Date: Dec. 12, 2013

(65) Prior Publication Data
US 2015/0336485 A1  Nov. 26, 2015

(51) Int. Cl.
*B60N 2/00* (2006.01)
*B60N 2/30* (2006.01)
(Continued)

(52) U.S. Cl.
CPC .............. *B60N 2/3011* (2013.01); *B60N 2/01* (2013.01); *B60N 2/2209* (2013.01); *B60N 2/242* (2013.01); *B60N 2/3013* (2013.01); *B60N 2/3031* (2013.01); *B60N 2/3045* (2013.01); *B60N 2/3065* (2013.01); *B60N 2/4606* (2013.01);
(Continued)

(58) Field of Classification Search
CPC ... B64D 11/06; B64D 11/0601; B64D 11/064; B64D 11/0693; B64D 2011/0617; B64D 2011/062; B60N 2/01; B60N 2/242; B60N 2/22; B60N 2/20; B60N 2/34; B60N 2/3011; B60N 2/4606; B60N 2/3045

USPC .......... 297/240, 243, 248, 257, 63, 65, 234, 297/236–238, 378.1, 317, 322, 341–343, 297/411.3, 411.32; 244/118.6, 122 R
See application file for complete search history.

(56) References Cited

U.S. PATENT DOCUMENTS 1,639,371 A * 8/1927 Freeman .................. B60N 2/14
248/393
1,668,213 A * 5/1928 Landine ............... B60N 2/3011
297/14
(Continued)

FOREIGN PATENT DOCUMENTS

CN       1412043 A     4/2003
CN       2714365 Y     8/2005
(Continued)

OTHER PUBLICATIONS

International Search Report for PCT/CN2012/076485, dated Mar. 14, 2013, 4 pages.
(Continued)

*Primary Examiner* — Beth Stephan
(74) *Attorney, Agent, or Firm* — Ware, Fressola, Maguire & Barber LLP

(57) ABSTRACT

A convertible seating unit (10, 12, 14, 50a, 50b, 54a, 58a, 58b, 62a, 62b) has at least one convertible seat (20, 56b, 60b, 64b, 80) with a back (30,86) and a bottom (32, 84). The back (30,86) and bottom (32, 84) may be positioned relative to each other in a first configuration to form a passenger seat. The back (30,86) and the bottom (32, 84) may also be positioned relative to each other in a second configuration to expose a space (48,88) accessible from behind and below the convertible seat (20, 56b, 60b, 64b, 80).

30 Claims, 7 Drawing Sheets

(51) Int. Cl.
*B60N 2/46* (2006.01)
*B64D 11/06* (2006.01)
*B60N 2/24* (2006.01)
*B60N 2/01* (2006.01)
*B60N 2/22* (2006.01)

(52) U.S. Cl.
CPC ........ *B64D 11/064* (2014.12); *B64D 11/0639* (2014.12); *B60N 2002/2204* (2013.01); *B60N 2205/30* (2013.01)

(56) References Cited

U.S. PATENT DOCUMENTS

| | | | | |
|---|---|---|---|---|
| 2,116,366 A * | 5/1938 | Scott | ................... | B60N 2/3011 297/234 |
| 2,621,708 A * | 12/1952 | Luce, Jr. | ................ | A47C 1/122 297/117 |
| 2,797,732 A * | 7/1957 | Thomas | ............... | B60N 2/3011 16/308 |
| 4,750,222 A * | 6/1988 | Quakenbush | ...... | A47C 17/1756 5/37.1 |
| 4,869,541 A * | 9/1989 | Wainwright | ......... | B60N 2/0292 296/65.09 |
| 5,069,503 A * | 12/1991 | Martinez | ................ | A47C 1/146 297/256 |
| 5,112,109 A * | 5/1992 | Takada | ................. | B60N 2/2222 297/320 |
| 5,335,971 A * | 8/1994 | Kelley | ................... | A47C 7/407 297/378.1 |
| 5,489,141 A * | 2/1996 | Strausbaugh | ........ | B60N 2/3011 297/14 |
| 5,829,836 A * | 11/1998 | Schumacher | ...... | B64D 11/0693 244/118.6 |
| 6,082,805 A * | 7/2000 | Gray | ........................ | B60N 2/34 296/65.09 |
| 6,106,066 A * | 8/2000 | Moffa | .................. | B60N 2/3011 297/326 |
| 6,663,174 B2 * | 12/2003 | Drage | .................. | B60N 2/3084 297/112 |
| 6,676,216 B1 * | 1/2004 | Freijy | .................. | B60N 2/3013 296/65.09 |
| 6,685,269 B1 * | 2/2004 | Freijy | .................. | B60N 2/206 297/257 |
| 6,846,044 B2 * | 1/2005 | Moffa | .................. | B60N 2/3043 297/14 |
| 7,137,663 B2 * | 11/2006 | Tsujibayashi | ...... | B60N 2/01583 296/65.03 |
| 7,578,551 B2 * | 8/2009 | Linero | ............... | B64D 11/0693 297/107 |
| 7,762,604 B1 * | 7/2010 | Lindsay | ............. | B60N 2/01583 296/64 |
| 8,251,427 B2 * | 8/2012 | Lindsay | ................. | B60N 2/062 296/64 |
| 2002/0113474 A1 | 8/2002 | Frank | | |
| 2004/0051003 A1 | 3/2004 | Cheung | | |
| 2005/0062324 A1 * | 3/2005 | Shimasaki | ............. | A47C 7/024 297/312 |
| 2005/0104431 A1 * | 5/2005 | Saberan | ................. | B60N 2/206 297/331 |
| 2007/0040418 A1 | 2/2007 | Ohkuma et al. | | |
| 2008/0252121 A1 * | 10/2008 | Smith | ................... | B60N 2/3011 297/236 |
| 2009/0008975 A1 * | 1/2009 | Behrens | ............... | B60N 2/3011 297/236 |
| 2009/0200839 A1 * | 8/2009 | Mildt | ....................... | B60N 2/20 297/118 |
| 2010/0327634 A1 * | 12/2010 | Johnson | ................. | B60N 3/004 297/118 |
| 2011/0175411 A1 * | 7/2011 | Wagner | ................. | B60N 2/3011 297/236 |
| 2011/0226900 A1 * | 9/2011 | Bamford | .............. | B60N 2/4495 244/118.6 |
| 2012/0056459 A1 * | 3/2012 | Harden | .................... | B60N 2/06 297/316 |
| 2012/0098319 A1 * | 4/2012 | Muck | .................... | B60N 2/4633 297/411.38 |

FOREIGN PATENT DOCUMENTS

| | | |
|---|---|---|
| DE | 102005025544 A1 | 12/2006 |
| WO | WO92/05072 A1 | 4/1992 |
| WO | 2013/160147 A1 | 10/2013 |

OTHER PUBLICATIONS

Supplementary European Search Report cover sheet (p. 1), Documents Considered to Be Relevant (p. 2), Annex (p. 3), and Examination (pp. 4-9) of Application No. EP 12 87 8439, Search Report dated Sep. 30, 2015, 9 pages total.

* cited by examiner

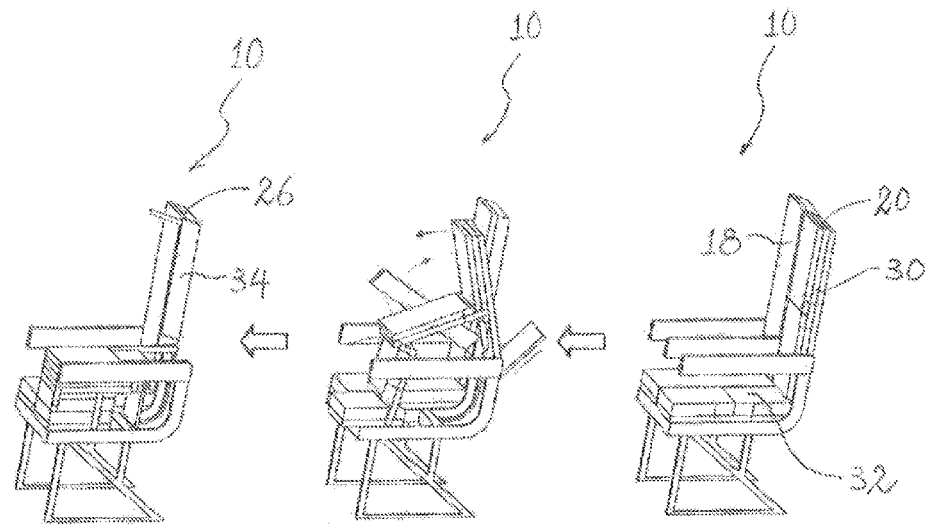
*Fig. 3C*  *Fig. 3B*  *Fig. 3A*
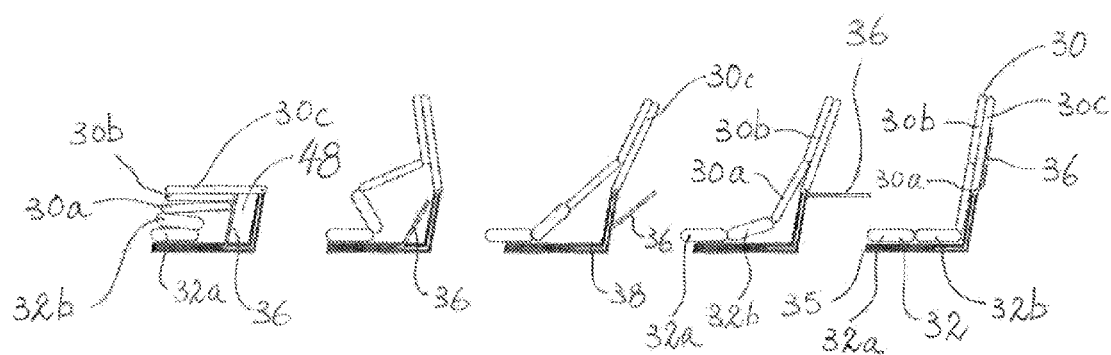
*Fig. 4E*  *Fig. 4D*  *Fig. 4C*  *Fig. 4B*  *Fig. 4A*

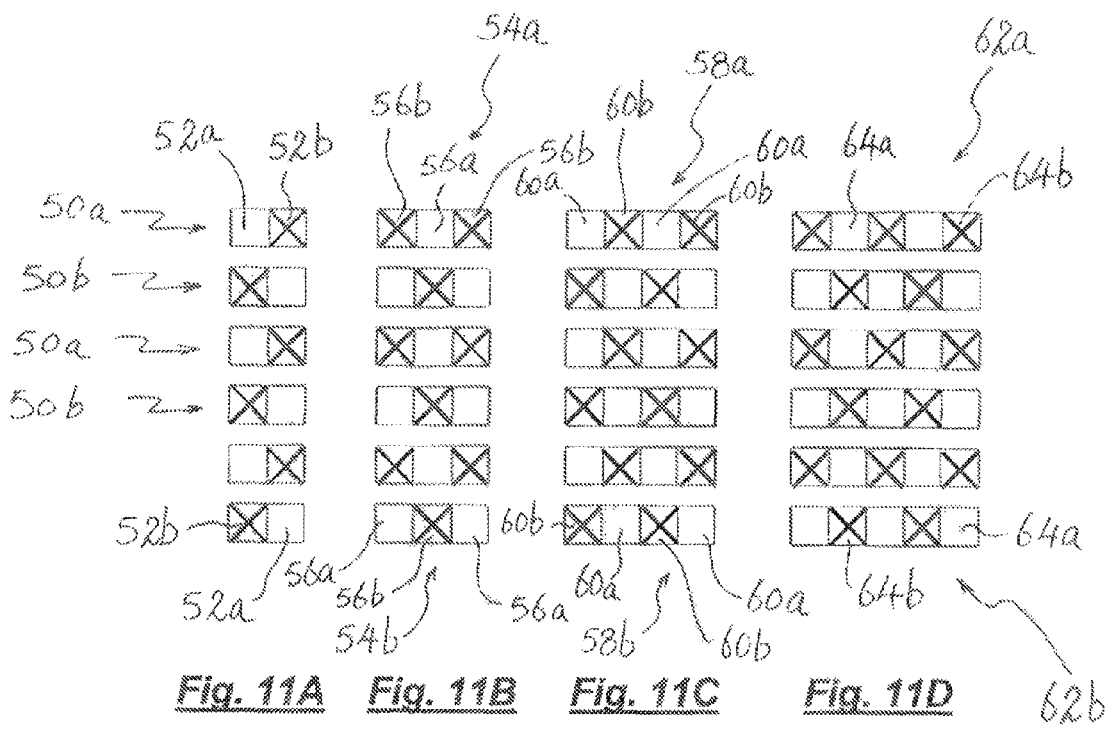
*Fig. 11A*  *Fig. 11B*  *Fig. 11C*  *Fig. 11D*

CONVERTIBLE SEATING UNIT

CROSS REFERENCE TO RELATED APPLICATIONS

This application is a national stage of PCT International patent application no. PCT/CN2012/076485, filed 5 Jun. 2012, the contents of which are hereby incorporated by reference.

TECHNICAL FIELD

This invention relates to a convertible seating unit and, in particular, such a seating unit suitable, but not limited, for use in passenger carrying vehicles, such as aircrafts, coach buses, hovercrafts.

BACKGROUND

It is common to arrange for more than one class of cabins in an aircraft. In addition to the relatively densely packed economy class, there is usually a separate cabin area for premium class (or business class) with a lower seating density, giving a greater seating width and legroom to satisfy passengers who can afford a higher budget.

The configuration of such cabins, i.e. the proportion between economy class and premium class is often fixed and cannot be modified quickly and easily. It is, of course, the case that demand for seats in the economy class and that for seats in the premium class vary across different flights and different seasons. As one fixed configuration cannot fit all the flights or adapt to varying demands for premium seats and economy seats, an airline company cannot operate to maximize its profit.

Convertible seating units have been proposed. Such seating units may be converted into seat arrangements of different seating densities, usually by adjusting the width of the seats by varying the number of seats in each row. In addition, U.S. Pat. No. 6,715,716 discloses a seat assembly in which part of a back portion of a seat of a front row is movable to form a leg support for a seat of an adjacent rear row.

However, although more legroom is available in the seat assembly of U.S. Pat. No. 6,715,716 such is only suitable for sleeping posture, which a passenger may not wish to adopt during most of the flight time. For hygiene reasons, passengers may not wish to occupy a seat which can be converted into a leg support. In any event, thorough cleaning of the seat of the front row is a must. Furthermore, such prior art convertible seating units do not provide sufficient differentiation between the economy-class configuration and the business-class configuration.

SUMMARY OF THE INVENTION

It is thus an object of the present invention to provide a convertible seating unit and a convertible seating unit arrangement in which the aforesaid shortcomings are mitigated or at least to provide a useful alternative to the trade and public.

According to a first aspect of the present invention, there is provided a convertible seating unit including at least a convertible seat with a back and a bottom, wherein said back and said bottom are positionable relative to each other in a first configuration to form a passenger seat, and wherein said back and said bottom are positionable relative to each other in a second configuration to expose a space accessible from behind and below said convertible seat.

According to a second aspect of the present invention, there is provided a convertible seating unit arrangement including at least a first convertible seating unit and a second convertible seating unit, wherein each said convertible seating unit includes at least a convertible seat with a back and a bottom, wherein said back and said bottom are positionable relative to each other in a first configuration to form a passenger seat, and wherein said back and said bottom are positionable relative to each other in a second configuration to expose a space accessible from behind and below said convertible seat.

According to a third aspect of the present invention, there is provided a convertible seating arrangement including a plurality of convertible seats and a plurality of non-convertible seats, wherein every other adjacent seats in both the width-wise direction and length-wise direction of said arrangement are said convertible seats with the remaining seats being said non-convertible seats, wherein each said convertible seat is convertible between a first configuration in which a passenger seat is formed and a second configuration in which more room is provided to a non-convertible seat beside or behind said convertible seat.

BRIEF DESCRIPTION OF THE DRAWINGS

Convertible seating units and convertible seating unit arrangements according to the present invention will now be described by way of examples only, with reference to the accompany drawings, in which:

FIGS. 3A to 3C show the steps through which one of the convertible seating units of FIG. 1 is converted from an economy-class two-seater configuration to a premium/business-class one-seater configuration;

FIGS. 4A to 4E show in more detail the steps through which the convertible seat of the seating unit of FIG. 3A is moved from an extended configuration to a folded configuration;

FIGS. 11A to 11D are a number of exemplary convertible seating unit arrangements according to the present invention; and FIGS. 12A and 12B show the configurations which a convertible seat of a convertible seating unit according to a further embodiment of the present invention may be in.

DETAILED DESCRIPTION OF THE INVENTION

Figure 1:
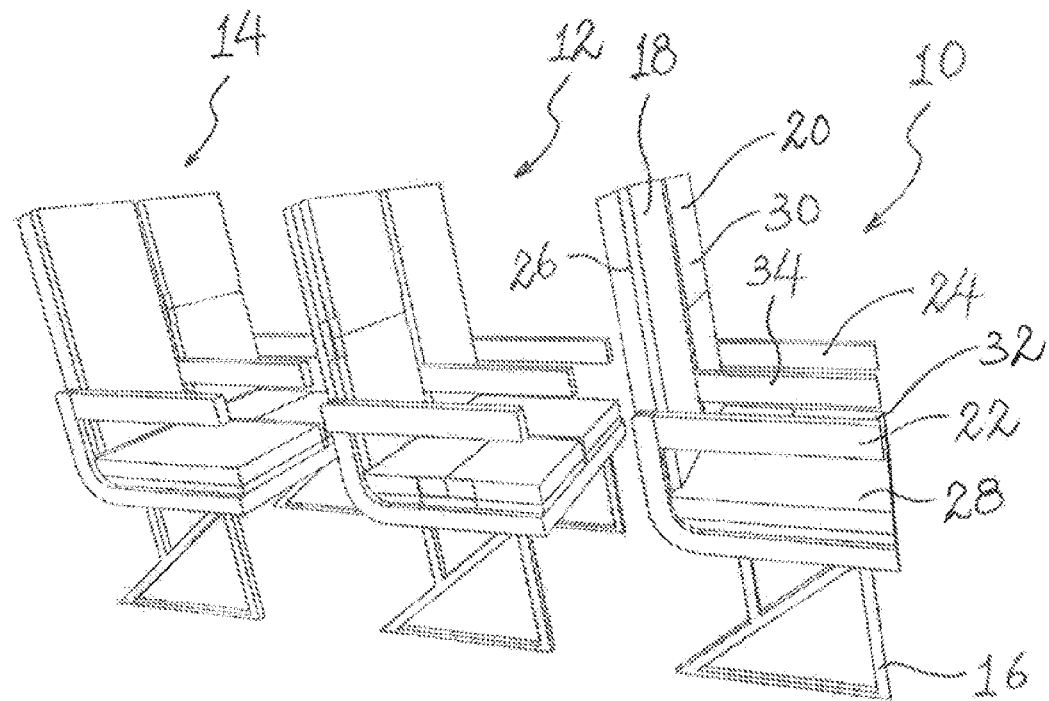
FIG. 1 is a front perspective view of three convertible seating units according to the present invention arranged parallel with one another in a column.
Figure 2:
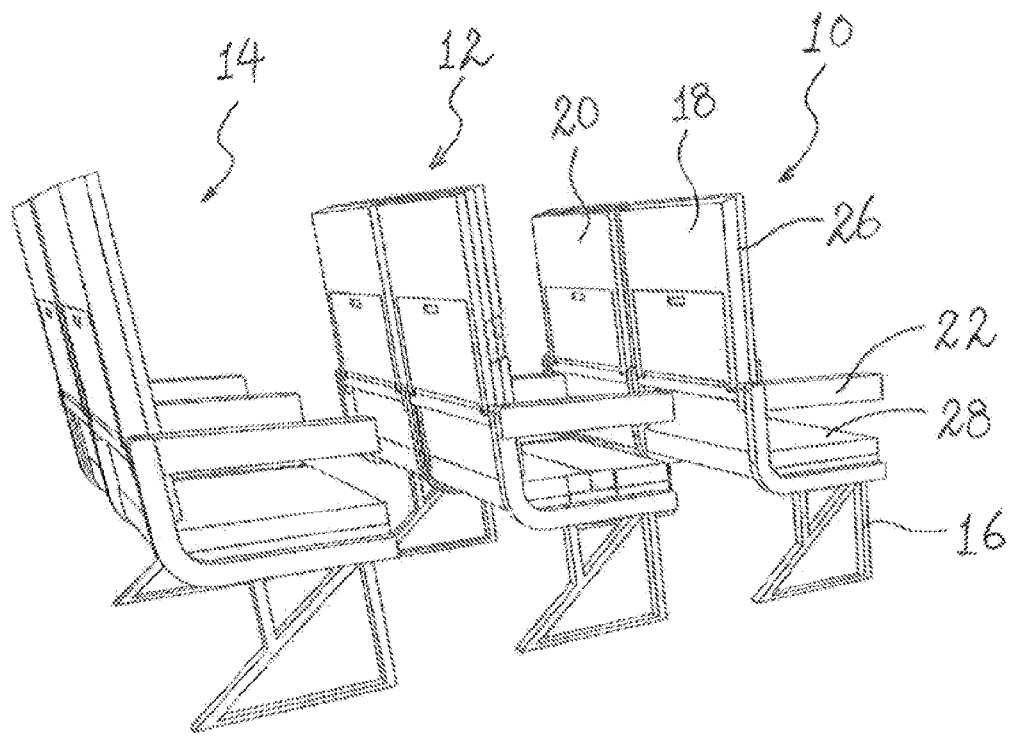
FIG. 2 is a rear perspective view of the three convertible seating units of FIG. 1.

Three convertible seating units according to the present invention are shown in FIGS. 1 and 2, generally designated as 10, 12, 14, respectively. The seating units 10, 12, 14, are arranged into a convertible seating unit arrangement in which the seating unit 12 is immediately behind the seating unit 10, and the seating unit 14 is immediately behind the seating unit 12, all facing a same direction. Each of the seating units 10, 12, 14 is shown here in an economy-class two-seater configuration. As the seating units 10, 14 are identically structured and the seating unit 12 is structured very similar to the seating unit 10, the structure of seating unit 10 will be discussed in more detail.

The convertible seating unit 10 has a support frame 16 which may be mounted to a passenger-carrying vehicle, such as an aircraft, coach bus, and hovercraft. The seating unit 10 has a non-convertible seat 18 and a convertible seat 20 which are fixedly mounted to the support frame 16, such that the non-convertible seat 18 and convertible seat 20 are side by side with each other, facing a same direction, and fixedly engaged relative to each other. The non-convertible seat 18 has an outer armrest 22 and the convertible seat 20 also has an outer armrest 24.

The non-convertible seat 18 has a back 26 and a bottom 28 which are engaged with the support frame 16. The back 26 and the bottom 28 are inclined relative to each other to form a passenger seat. As generally known, the back 26 may be pivoted relative to the bottom 28 through a small angle to vary and adjust the angle of inclination between the back 26 and the bottom 28.

The convertible seat 20 also has a back 30 and a bottom 32 which are engaged with the support frame 16. The convertible seat 20 is shown in FIGS. 1 and 2 in an extended configuration in which the back 30 is fully extended and is inclined relative to the bottom 32, which is also fully extended. In particular, the back 30 extends generally upwardly and the bottom 32 is generally horizontal. When the convertible seat 20 is in the extended configuration, the back 30 may also be pivoted relative to the bottom 32 through a small angle to vary and adjust the angle of inclination between the back 30 and the bottom 32.

An armrest 34 is provided between the non-convertible seat 18 and convertible seat 20. The armrest 34 is pivotable about a horizontal axis which passes through the back 26 of the non-convertible seat 18 and the back 30 of the convertible seat 20. The armrest 34 is pivotable between a lowered position (as shown in FIGS. 1 and 2) in which it separates the non-convertible seat 18 and convertible seat 20 (thus forming an economy-class two-seater arrangement) and a raised position in which it extends generally upwardly and is between the back 26 of the non-convertible seat 18 and the back 30 of the convertible seat 20.

As shown in FIGS. 3A to 3C, the convertible seat 20 of the seating unit 10 can be moved from the extended configuration as shown in FIG. 3A to the folded or collapsed configuration as shown in FIG. 3C by moving the bottom 32 relative to the back 30 (in a matter to be discussed further below). The armrest 34 is also pivotable from its lowered position (as shown in FIG. 3A) to its raised position (as shown in FIG. 3C) so that it lies side by side, adjacent and at the same inclination as the back 26 of the non-convertible seat 18. When the convertible seat 20 is in the extended configuration, it is of essentially identical dimensions as the non-convertible seat 18.

When the convertible seat 20 is in the folded configuration and the armrest 34 is in the raised position, as shown in FIG. 3C, more lateral space is given to the adjacent non-convertible seat 18, and the folded convertible seat 20 functions as a large side table for the non-convertible seat 18. A premium-class or business-class one-seater is thus formed.

FIGS. 4A to 4E show the steps through which the convertible seat 20 is converted from the extended configuration (as shown in FIG. 4A) to the collapsed/folded configuration (as shown in FIG. 4E). FIG. 4A shows the convertible seat 20 in the extended configuration in which the back 30 is inclined relative to the bottom 32. The bottom 32 comprises a first bottom part 32a and a second bottom part 32b which are pivotally connected with each other. When in the extended configuration, both the first bottom part 32a and second bottom part 32b are co-planar with each other and lie on a lower generally horizontal part 35 of the support frame 16.

The back 30 of the convertible seat 20 is made up of a first back part 30a, a second back part 30b and a third back part 30c. The first back part 30a and the second back part 30b are pivotally connected with each other, whereas the third back part 30c is fixedly engaged with the second back part 30b for simultaneous movement. In particular, a rear major surface of the second back part 30b fixedly abuts part of a major surface of the third back part 30c. When the convertible seat 20 is in the extended configuration, the first back part 30a is co-planar with the second back part 30b, and is parallel to the third back part 30c.

To the third back pan 30c is engaged a plate 36 which is pivotable relative to the third back part 30c and the support frame 16. The plate 36 is pivotable between an upwardly extending stowed position (as shown in FIG. 4A) in which the plate 36 abuts and is parallel to the third back part 30c and a horizontal in-use position (as shown in FIG. 4B) in which the plate 36 may function as a tray table for the passenger in the seat immediately behind the convertible seat 20.

Figure 6:
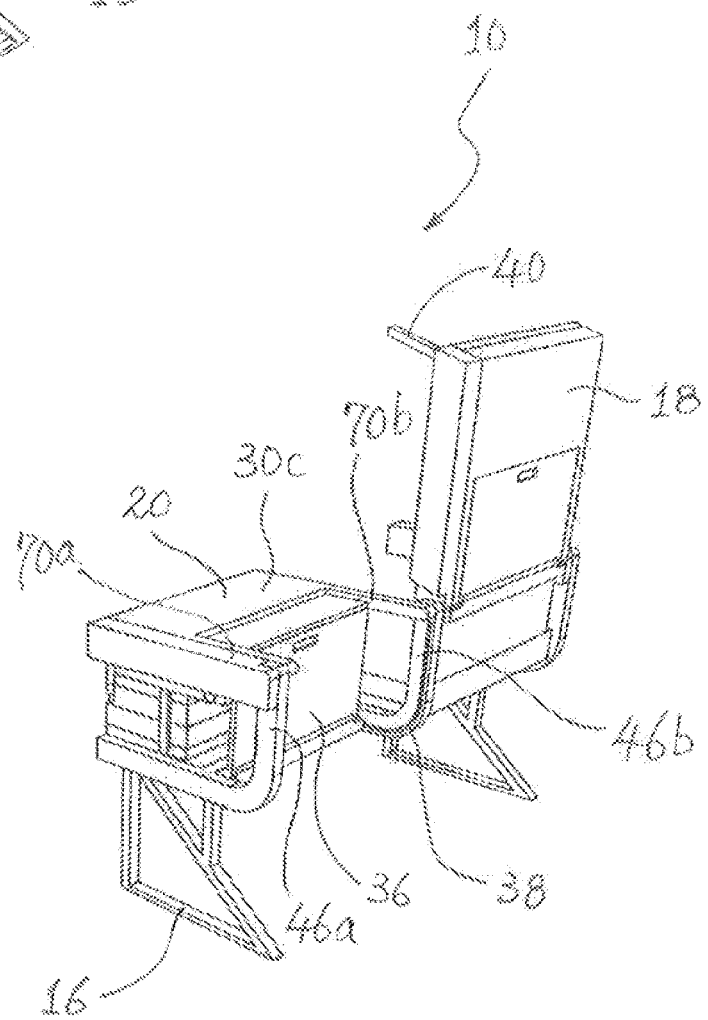
FIG. 6 is a rear perspective view of the seating unit of FIG. 5.

To move the convertible seat 20 from the extended configuration to the folded configuration, the two bottom parts 32a, 32b are moved relative to the back 30, in particular, forwardly and away from the back 30 to pivot the first back part 30a relative to the second back part 30b and away from the support frame 16 (as shown in FIG. 4B). In moving the convertible seat 20 from the extended configuration to the folded configuration, the plate 36 is slid along two parallel tracks 38 (of which only one is shown in FIG. 6) of the support frame 16 from the location in FIGS. 4A and 4B, through the position in FIG. 4C, the position in FIG. 4D, and finally to the position in FIG. 4E. When the plate 36 is in the location shown in FIG. 4E, the plate 36 is positionable relative to the support frame 16 in a stowed position (as shown in FIGS. 4E and 6) in which it extends generally upwardly from the support frame 16. It can be seen that the location which the plate 36 occupies in FIG. 4E is lower than the location in which the plate 36 occupies in FIGS. 4A and 4B. If the plate 36 is to be used by the passenger in the seat immediately behind the now folded/collapsed convertible seat 20, the plate 36 is to be moved back to the position shown in FIG. 4B and pivoted to the horizontal in-use position shown in FIG. 4B.

It can be seen that, through the folding/collapsing of the first back part 30a, second back part 30b, first bottom part 32a, and second bottom part 32b (which are pivotally interconnected with one another), when the convertible seat 20 is in the folded/collapsed configuration as shown in FIG. 4E, the first back part 30a, the second back part 30b and the third back part 30c are above and parallel to the first bottom part 32a and the second bottom part 32b, with the first bottom part 32a lying on the lower part 35 of the support frame 16, the second bottom part 32*b* being folded to lie on the first bottom part 32*a*, the first back part 30*a* being folded to lie on the second bottom part 32*b*, the second back part 30*b* being folded to lie on the first back part 30*a*, and the third back part 30*c* lying on the second back part 30*b*. The third back part 30*c* thus provides a top surface for support of various articles for the passenger in the adjacent non-convertible seat 18.

It should of course be understood that the convertible seat 20 may be moved from the folded/collapsed configuration as shown in FIG. 4E back to the extended configuration as shown in FIG. 4A, by going through the configurations as shown in FIGS. 4D, 4C and 4B consecutively.

Figure 5:
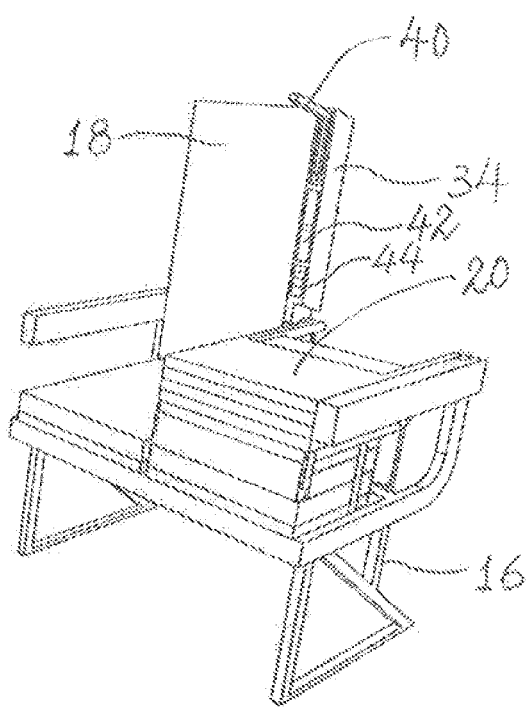
FIG. 5 is a front perspective view of the seating unit of FIG. 3C in which the convertible seat of the seating unit is in the folded configuration.

FIGS. 5 and 6 show, respectively, a front perspective view and a rear perspective view of the seating unit 10 with the convertible seat 20 in the folded configuration. As shown in FIG. 5, when the armrest 34 is in the raised position, a number of amenities, such as reading light 40, storage/eyeglass holder 42, and power supply socket 44 carried by the armrest 34 are revealed and accessible to the passenger in the adjacent non-convertible seat 18.

It can be seen from a comparison of FIG. 2 and FIG. 6 that, when the convertible seat 20 is moved from the extended configuration to the folded configuration, a space 48 (see FIG. 10) defined by the plate 36 and two parallel, curved and spaced-apart arms 46*a*, 46*b* of the support frame 16 is exposed. This additional space 48 is accessible from below and behind the convertible seat 20 by a passenger in a seat immediately behind the convertible seat 20 of the seating unit 10. Thus, the passenger sitting immediately behind the convertible seat 20 of the seating unit 10 will be given more legroom. It can also be seen that when the convertible seat 20 is in the extended configuration, access to the space 48 from behind and below the convertible seat 20 is denied because of the presence of the second bottom part 32*b* and the first back part 30*a* which are pivotally connected with each other.

It can be seen that the third back part 30*c* has two legs 70*a*, 70*b* which are parallel to and spaced apart from each other. Thus, when the convertible seat 20 is in the extended configuration, the third back part 30*c* of the back 30 has an open lower end which is closed on one side by the first back part 30*a* and on an opposite side by the plate 36 when in the stowed position. When the convertible seat 20 is converted from the extended configuration to the folded configuration, the second bottom part 32*b* and the first back part 30*a* are pivoted relative to each other and moved away from the arms 46*a*, 46*b* of the support frame 16 to expose the space 48 between the arms 46*a*, 46*b*.

It can be seen from FIG. 6 that the leg 70*a* of the third back part 30*c* is pivotally engaged with the arm 46*a*, and the leg 70*b* of the third back part 30*c* is pivotally engaged with the arm 46*b*. The third back part 30*c* is thus pivotally engaged with and movable relative to the support frame 16 between the upwardly extended position shown in FIG. 1 and the horizontal configuration shown in FIG. 4E in which it is above and parallel to the first bottom part 32*a* and the second bottom part 32*b*.

Figure 7:
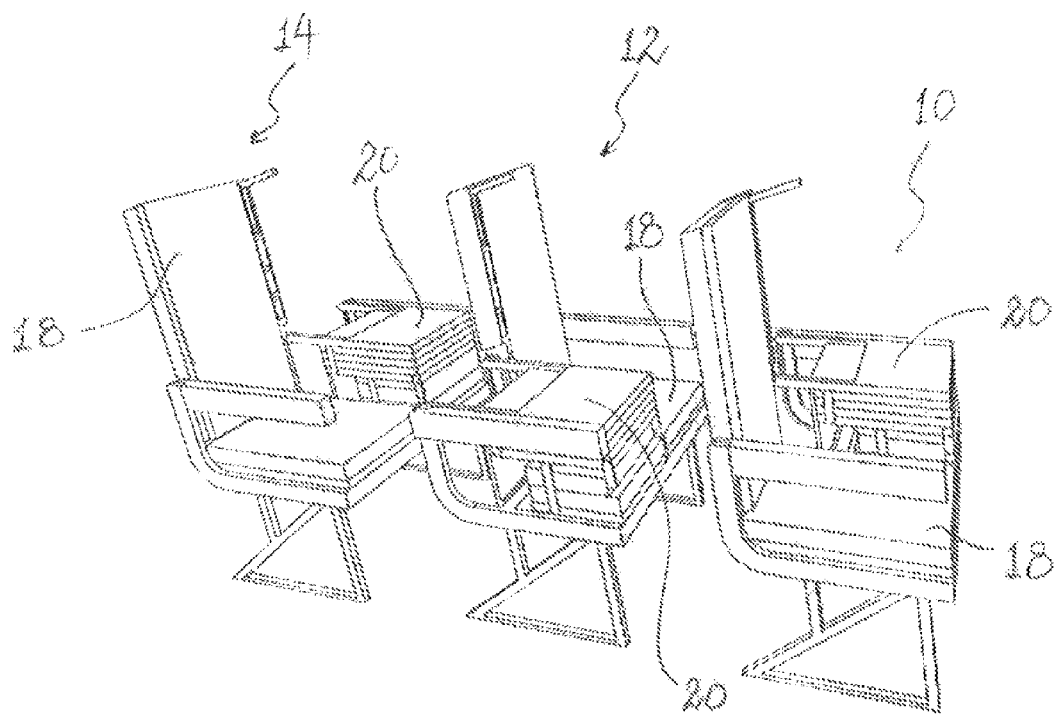
FIG. 7 is a front perspective view of the three convertible seating units in FIG. 1 in which their respective convertible seats are in the folded configuration.
Figure 8:
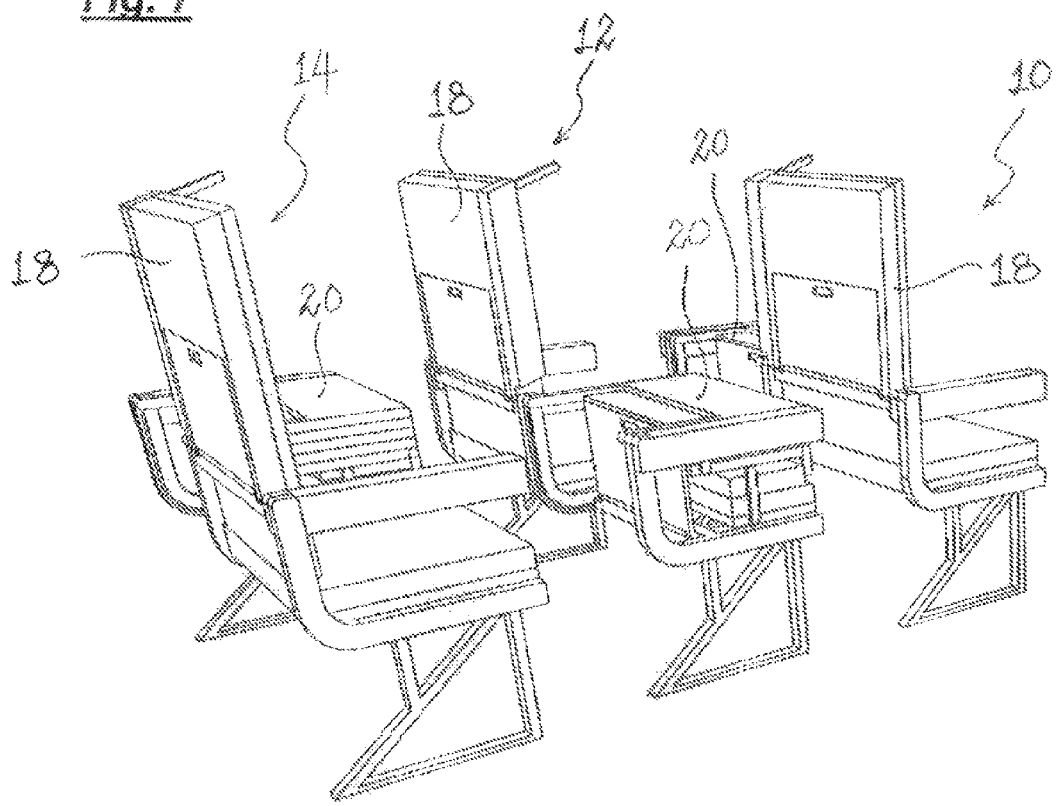
FIG. 8 is a rear perspective view of the convertible seating units of FIG. 7.

FIGS. 7 and 8 show the three convertible seating units 10, 12, 14, in an arrangement which they are parallel with one another in a column, and facing a same direction, and with all their respective convertible seat 20 moved to the folded configuration. The seating unit 12 is behind the seating unit 10, with the non-convertible seat 18 of the seating unit 12 behind the convertible seat 20 of the seating unit 10. The seating unit 14 is behind the seating unit 12 with the non-convertible seat 18 of the seating unit 14 behind the convertible seat 20 of the seating unit 12. It can be seen that while the seating units 10, 14 are identically structured, the seating unit 12 differs from the seating units 10, 14 only in the relative left-right positioning of the non-convertible seat 18 and the convertible seat 20.

Figure 9:
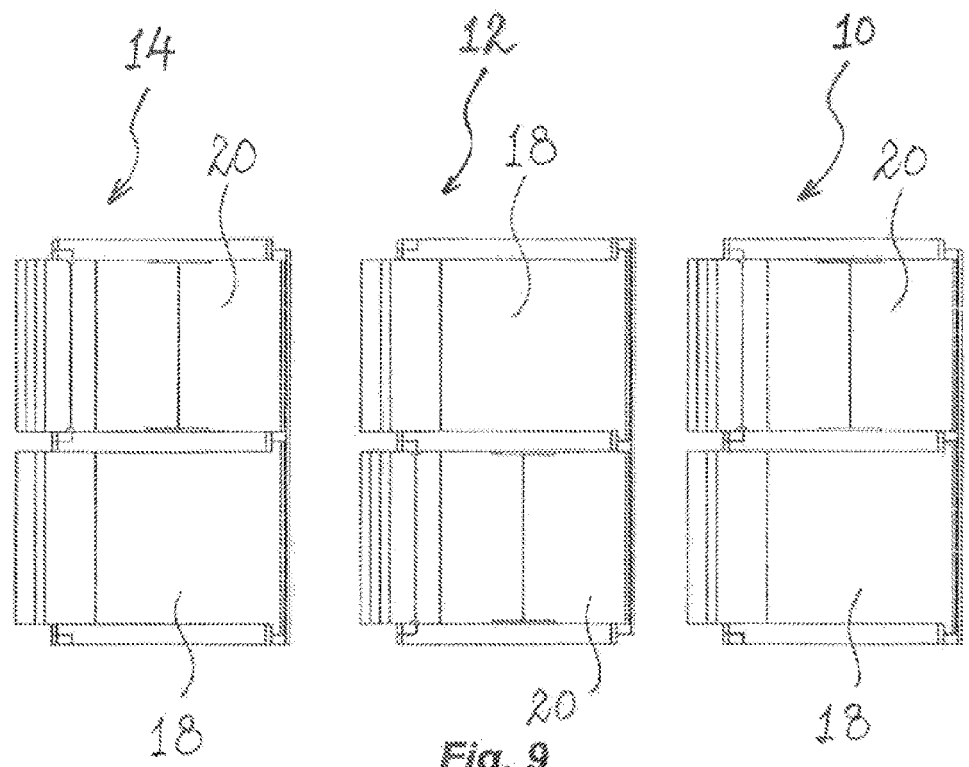
FIG. 9 is a top view of the three convertible seating units of FIG. 1.
Figure 10:
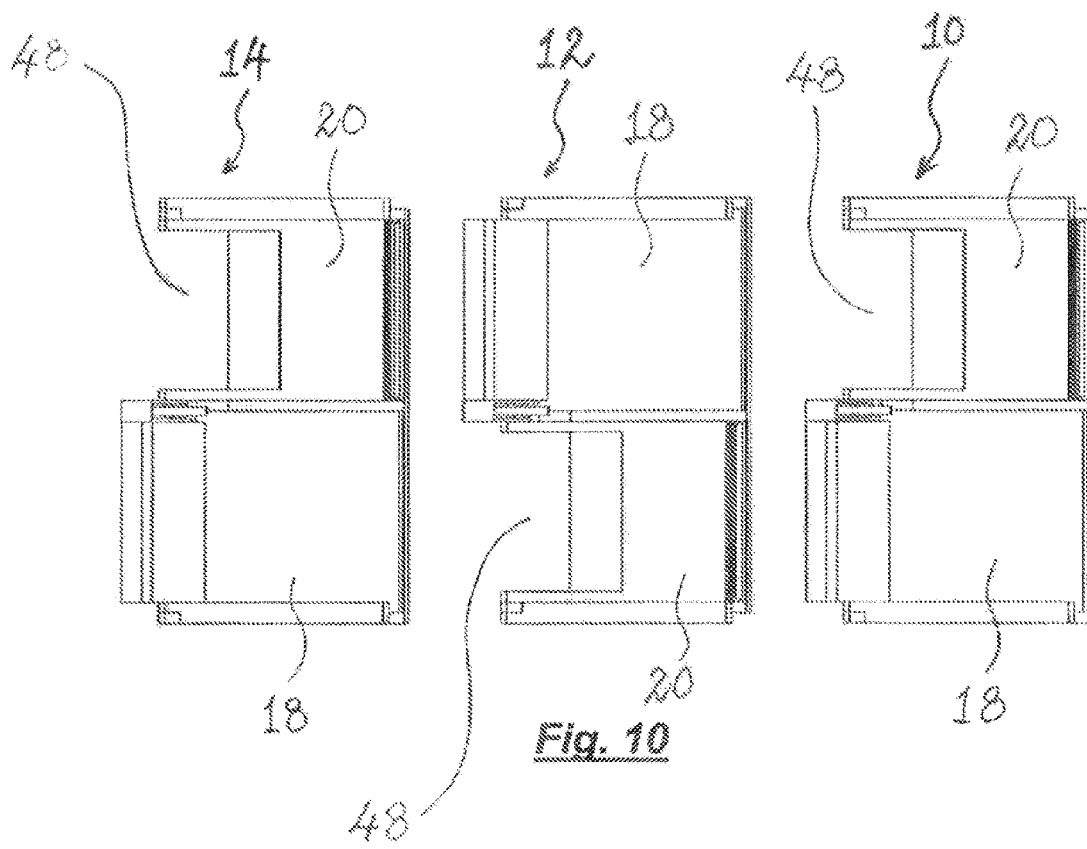
FIG. 10 is a top view of the three convertible seating units of FIG. 7.

As shown in FIG. 9, when all the convertible seats 20 of the seating units 10, 12, 14 are in their extended configuration, a column of economy-class two-seaters are provided. When the convertible seats 20 of the seating units 10, 12, 14 are in their folded/collapsed configuration, as shown in FIG. 10, a column of premium/business-class one-seater are provided. For each non-convertible seat 18 in the seating units 10, 12, 14 in the arrangement shown in FIG. 10, the width of the seating area (bottom 28) is increased after movement of the armrest 34 from the lowered position to the raised position, and further legroom is provided to the passengers in the seating units 12, 14 by the space 48 generated in front of them after moving the convertible seats 20 of the seating units 10, 12 to their folded configuration. The perceived space for each passenger in the non-convertible seat 18 is also increased because the convertible seat 20 in front is collapsed/folded, allowing the passenger's eyesight to reach further.

FIGS. 11A to 11D show various convertible seating unit arrangements according to the present invention, in which "☐" represents a non-convertible seat and "☒" represents a convertible seat.

In the arrangement shown in FIG. 11A, there are two kinds of convertible seating units 50*a*, 50*b* arranged alternately along a column, parallel to one another, in an array. Each of the convertible seating units 50*a*, 50*b* includes a non-convertible seat 52*a* and a convertible seat 52*b* arranged side by side with each other, and facing a same direction. The seating units 50*a* differ from the seating units 50*b* only in the relative left-right positioning of the non-convertible seat 52*a* and convertible seat 52*b*.

In the arrangement shown in FIG. 11B, there are again two kinds of convertible seating units 54*a*, 54*b* arranged alternately along a column, parallel to one an other, in an array of non-convertible seats 56*a* and convertible seats 56*b* facing a same direction. When all the convertible seats of the convertible seating units 54*a*, 54*b* are in their extended configuration, each convertible seating unit 54*a*, 54*b* is in the form of an economy-class three-seater. For the convertible seating unit 54*a*, a non-convertible seat 56*a* is between and side by side with two convertible seats 56*b*. For the convertible seating unit 54*b*, a convertible seat 56*b* is between and side by side with two non-convertible seats 56*a*.

In the arrangement shown in FIG. 11C, there are also two kinds of convertible seating units 58*a*, 58*b* arranged alternately along a column, parallel to one another, in an array of non-convertible seats 60*a* and convertible seats 60*b* facing a same direction. Each of the convertible seating units 58*a*, 58*b* includes two non-convertible seats 60*a* and two convertible seats 60*b* alternately arranged side by side with each other. When all the convertible seats 60*b* of the convertible seating units 58*a*, 58*b* are in their extended configuration, each converting seating unit 58*a*, 58*b* is in the form of an economy-class four-seater. The convertible seating unit 58*a* differs from the convertible seating unit 58*b* only in that, in the convertible seating unit 58*a*, the leftmost seat (in the sense of FIG. 11C) is a non-convertible seat 60*a*, whereas in the convertible seat unit 58*b*, the leftmost seat (again in the sense of FIG. 11C) is a convertible seat 60*b*. Thus, when the convertible seats 60*b* of the convertible seating units 58*a*, 58b are in their folded configuration, each of the convertible seating units 58a, 58b is in the form of a premium/business-class two-seater.

Turning now to the convertible seating unit arrangement shown in FIG. 11D, there are again two kinds of convertible seating units 62a, 62b arranged alternately along a column, parallel to one another, in an array of non-convertible seats 64a and convertible seats 64b facing a same direction. The seating unit 62a has two non-convertible seats 64a and three convertible seats 64b alternately arranged side by side with each other, and the seating unit 62b has three non-convertible seats 64a and two convertible seats 64b alternately arranged side by side with each other.

It can be seen that the basic idea of all the convertible seating unit arrangements in FIGS. 11A to 11D is to have the two kinds of convertible seat units 50a, 50b; 54a, 54b; 58a, 58b; and 62a, 62b alternately arranged in parallel one after the other, with all their non-convertible seats and convertible seats facing a same direction, and with a non-convertible seat of one of the two kinds of convertible seat units behind a convertible seat of the other of the two kinds of convertible seat units. More particularly, every other adjacent seats in both the width-wise direction and length-wise direction are convertible seats and the remaining seats are non-convertible seats, thus forming a checkerboard pattern or array.

It can be seen that the convertible seating units 10, 12, 14, 50a, 50b, 54a, 54b, 58a, 58b, 62a and 62b may be formed into arrangements which allow for quick and easy conversion between economy-class seats and premium/business-class seats, thus optimizing the use of cabin space.

While the present invention has thus far been discussed in the context in which the convertible seats 20, 56b, 60b, 64b are movable between an extended configuration and a folded configuration in which at least part of the back 30 is folded onto at least part of the bottom 32, it is envisaged that the convertible seats 20, 56b, 60b, 64b may be structured differently. A convertible seat 80 forming a or part of a convertible seating unit is shown in FIGS. 12A and 12B.

Figures 12A, 12B:
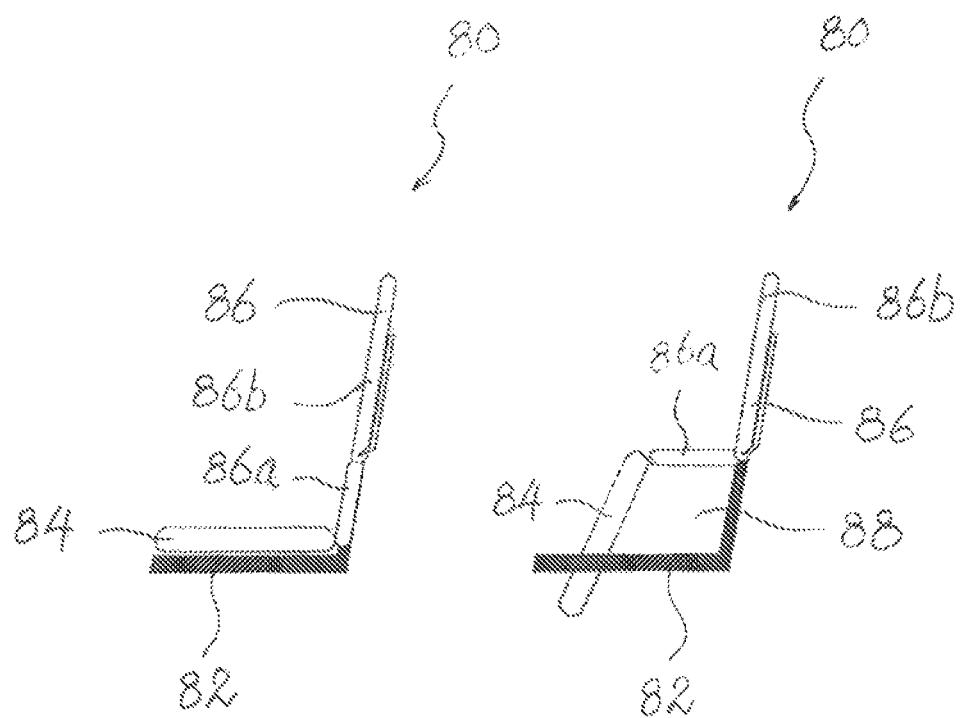

As shown in FIGS. 12A and 12B, the convertible seat 80 includes a support frame 82 to which a bottom 84 and a back 86 are engaged for relative pivotal movement. The back 86 includes a first back part 86a and a second back part 86b which are pivotally engaged with each other. The bottom 84 and the first back part 86 are also pivotally engaged with each other. While the second back part 86b is fixedly engaged with the support frame 82, the bottom 84 and the first back part 86a are movable (in particular, pivotable) relative to the support frame 82.

When the back 86 and the bottom 84 of the convertible seat 80 are positioned relative to each other in the configuration shown in FIG. 12A, the back 86 and the bottom 84 collectively form a passenger seat. When the back 86 and the bottom 84 are pivoted relative to each other and relative to the support frame 82 to be positioned relative to each other in the configuration shown in FIG. 12B, the first back part 86a provides an upper surface for support of various articles for a non-convertible seat (not shown) adjacent and side by side with the convertible seat 80.

When the back 86 and the bottom 84 are moved from the configuration shown in FIG. 12A to the configuration shown in FIG. 12B, a space 88 is exposed which is accessible from below and behind the convertible seat 80 by a passenger in a seat immediately behind the convertible seat 80. When the back 86 and the bottom 84 are positioned relative to each other in the configuration shown in FIG. 12A, the space 88 is not accessible by a passenger in a seat immediately behind the convertible seal 80 because of the positioning of the bottom 84 and the back 86.

It can be seen that a common principle behind the construction or the respective convertible seat 20, 80 is that, when the respective back 30, 86 and the respective bottom 32, 84 of the respective convertible seat 20, 80 are positioned relative to each other in the configuration shown in FIGS. 4A and 12A respectively, a passenger seat is formed, and that when the respective back 30, 86 and the respective bottom 32, 84 are moved so as to be positioned relative to each other in the configuration shown in FIGS. 4E and 12B respectively, a respective space 48, 88 is exposed which is accessible from below and behind the respective convertible seat 20, 80, by a passenger in a seat immediately behind the respective convertible seat 20, 80, thus allowing more legroom to the passenger in the seat immediately behind the respective convertible seat 20, 80.

It is another aspect of the present invention that a convertible seat arrangement is provided in which convertible seats and non-convertible seats are arranged in a checkerboard manner. In particular, a number of convertible seats and a number of non-convertible seats are provided in such an arrangement such that they all face a same direction, and every other adjacent seat in both the width-wise direction and length-wise direction of the arrangement are convertible seats with the remaining seats being non-convertible seats. Each convertible seat is convertible between a first configuration in which a passenger seat is formed and a second configuration in which more room is provided to a non-convertible seat beside or immediately behind the convertible seat. Such an arrangement may be formed of any of the convertible seating units (10, 12, 14, 50a, 50b, 54a, 54b, 58a, 58b, 62a, 62b) arranged parallel to one another in an array.

Although the invention has thus for been described in the context of convertible seating units (10, 12, 14, 50a, 50b, 54a, 54b, 58a, 58b, 62a, 62b) having at least one non-convertible seat (18, 56a, 60a, 64a) and at least one convertible seat (20, 56b, 60b, 64b, 80) fixedly engaged relative to each other side by side, it is envisaged that convertible seating units according to the present invention may be formed of convertible seats only.

More particularly, it is envisaged that a convertible seating unit according to this invention may include one or more convertible seats, but no non-convertible seat. One such embodiment of a convertible seating unit includes one convertible seat only, with no other seat. A further embodiment of such a convertible seating unit according to this invention includes a plurality of convertible seats engaged with and arranged side by side with each other, all facing a same direction, with no non-convertible seat. Such convertible seats may be mounted to the support frame (16, 82) so that the convertible seats are side by side with and fixedly engaged relative to one another, all facing a same direction.

A convertible seating unit arrangement may be formed of a number of such convertible-seat-only convertible seating units. In particular, a number of such convertible-seat-only convertible seating units may be formed in an array (e.g. in rows and columns) such that they are parallel with one another with all their convertible seats facing a same direction. Such an arrangement offers more flexibility and maneuverability to an operator of a passenger-carrying vehicle to which such an arrangement is adopted, as one can freely decide which of the plurality of convertible seats in the convertible seating units forming the arrangement is/are to be converted (e.g. moved to the folded/collapsed configuration) so as to provide more seating width to a passenger in an adjacent seat and/or more legroom to a passenger in a seat immediately behind.

It should be understood that the above only illustrates examples whereby the present invention may be carried out, and that various modifications and/or alterations may be made thereto without departing from the spirit of the invention.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub combinations.

The invention claimed is:

1. A seating unit including at least a convertible seat with a back and a bottom, wherein said back and said bottom are positionable relative to each other in a first configuration in which a passenger seat is formed,
   wherein, when said back and said bottom are in said first configuration, said bottom is generally horizontal and said back extends generally upwardly,
   wherein, when said back and said bottom are in said first configuration, a space is occupied by at least part of said back or at least part of said bottom,
   wherein said space is exposed and accessible from behind and below said convertible seat after positioning of said back and said bottom relative to each other to a second configuration, and
   wherein, when said back and said bottom of said convertible seat are in said second configuration, at least part of said back is generally horizontal and is above said bottom,
   wherein said back and said bottom of said convertible seat are movable relative to each other,
   wherein said back of said convertible seat includes a first back member and a second back member which are movable relative to each other,
   wherein, when said back and said bottom of said convertible seat are in said first configuration, said first back member and said second back member are substantially co-planar with each other,
   wherein, when said back and said bottom are in said first configuration, a first surface of said first back member faces backward and a second surface of said bottom faces downward, and said first surface of said first back member and said second surface of said bottom subtend an angle of more than 180°, and
   wherein, when said back and said bottom are in said second configuration, said first surface of said first back member and said second surface of said bottom subtend an angle of less than 180°.

2. A seating unit according to claim 1 including a support mountable to a passenger-carrying vehicle.

3. A seating unit according to claim 2 wherein said convertible seat is mounted to said support.

4. A seating unit according to claim 3 wherein at least part of said bottom of said convertible seat is movable relative to said support to expose said space.

5. A convertible seating arrangement comprising solely a plurality of convertible seating units having the seating unit including the at least one convertible seat according to claim 1.

6. A seating unit according to claim 2 wherein said at least part of said back of said convertible seat is pivotally engaged with said support and when said back and said bottom of said convertible seat are in said second configuration, said at least part of said back and said bottom are also generally parallel to a horizontal part of said support.

7. A seating unit according to claim 6 wherein said at least part of said back of said convertible seat includes a leg member which is pivotally engaged with an arm member of said support.

8. A seating unit according to claim 1 wherein said back and said bottom of said convertible seat are pivotally connected with each other.

9. A seating unit according to claim 8 wherein said bottom of said convertible seat includes a first bottom member and a second bottom member pivotally connected with each other.

10. A seating unit according to claim 9 wherein, when said back and said bottom of said convertible seat are in said first configuration, said first bottom member and said second bottom member are substantially co-planar with each other.

11. A seating unit according to claim 9 wherein, when said back and said bottom of said convertible seat are in said second configuration, said second bottom member lies on said first bottom member.

12. A seating unit according to claim 8 wherein said back of said convertible seat includes a first back member and a second back member which are pivotally connected with each other.

13. A seating unit according to claim 12 wherein, when said back and said bottom of said convertible seat are in said first configuration, said first back member and said second back member are substantially co-planar with each other.

14. A seating unit according to claim 13 wherein, when said back and said bottom of said convertible seat are in said second configuration, said second back member lies on said first back member.

15. A seating unit according to claim 12 wherein said back of said convertible seat includes a third back member fixedly engaged with said second back member.

16. A seating unit according to claim 15 wherein, when said back and said bottom of said convertible seat are in said second configuration, said third back member lies on said second back member.

17. A seating unit according to claim 16 wherein said third back member includes an open end which is closable on a first side by said first back member and on an opposite second side by a plate member.

18. A seating unit according to claim 17 wherein, when said back and said bottom of said convertible seat are in said first configuration, said plate member is at a first location in which it is pivotable relative to said third back member between a first position in which said plate member abuts and is substantially parallel to said third back member and a second position in which said plate member is generally horizontal.

19. A seating unit according to claim 18 wherein, when said back and said bottom of said convertible seat are moved from said first configuration to said second configuration, said plate member is slidable from said first location to a second location which is lower than said first location.

20. A seating unit according to claim 1, further comprising at least one seat, wherein said seat includes a back and a bottom forming a passenger seat.

21. A seating unit according to claim 20 wherein said seat is side by side with said convertible seat.

22. A seating unit according to claim 20 wherein said seat is mounted to a support mountable to a passenger-carrying vehicle.

23. A seating unit according to claim 20 wherein said seat and said convertible seat are fixedly engaged relative to each other.

24. A seating unit according to claim 20, further comprising an armrest pivotable between a lowered position in which said armrest separates said seat and said convertible seat and a raised position in which said armrest is between said back of said seat and said back of said convertible seat.

25. A seating unit according to claim 20, further comprising at least one further seat, wherein said convertible seat is between and side by side with said two seats.

26. A seating unit according to claim 20, further comprising at least one further convertible seat, wherein said seat is between and side by side with said two convertible seats.

27. A convertible seating unit arrangement including at least two of the seating units of claim 1.

28. A convertible seating unit arrangement according to claim 27 wherein a second unit of the at least two seating units is parallel to and behind a first unit of the at least two seating units, wherein said second seating unit further includes at least one seat, and wherein said at least one seat of said second seating unit is behind a convertible seat of said first seating unit.

29. A convertible seating unit arrangement including a plurality of convertible seating units having the seating unit including the at least one convertible seat according to claim 1 and a plurality of further seating units, wherein said convertible seating units and said further seating units are alternately arranged relative to one another.

30. A convertible seating arrangement, comprising:

at least one first-type row of seats aligned side-by-side along a first line perpendicular to a seating direction of said convertible seating arrangement wherein all seats of said at least one first-type row of seats alternate along said first line between a convertible seat and a non-convertible seat, at least one second-type row of seats aligned side-by-side along a second line also perpendicular to said seating direction of said convertible seating arrangement whereby the first line is parallel to said second line, wherein all seats of said at least one second-type row of seats alternate along said second line between a non-convertible seat and a convertible seat, and wherein each non-convertible seat of said at least one second-type of row of seats is positioned directly behind a convertible seat of said at least one first-type row of seats, without any intervening seat, and wherein each said convertible seat is convertible from a first configuration in which a passenger seat is formed to a second configuration to expose a top space above said convertible seat accessible to a non-convertible seat beside said convertible seat and to expose a bottom space under said convertible seat, wherein both said top space and said bottom space are accessible from behind said convertible seat.

* * * * *